(12) United States Patent
Mahany et al.

(10) Patent No.: US 8,236,199 B2
(45) Date of Patent: Aug. 7, 2012

(54) PHOSPHORESCENT/FLUORESCENT COMPOSITIONS AND METHODS

(75) Inventors: Thomas Mahany, Royal Oak, MI (US); William Yen, Athens, GA (US); Laurel C. Yen, legal representative, Athens, GA (US); Gennaro J. Gama, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 889 days.

(21) Appl. No.: 11/661,730

(22) PCT Filed: Sep. 2, 2005

(86) PCT No.: PCT/US2005/031580
§ 371 (c)(1),
(2), (4) Date: Jun. 10, 2009

(87) PCT Pub. No.: WO2006/029100
PCT Pub. Date: Mar. 16, 2006

(65) Prior Publication Data
US 2011/0095232 A1    Apr. 28, 2011

Related U.S. Application Data

(60) Provisional application No. 60/607,007, filed on Sep. 2, 2004.

(51) Int. Cl.
| C09B 69/00 | (2006.01) |
| C09D 5/22 | (2006.01) |
| C09D 13/00 | (2006.01) |
| C09K 11/02 | (2006.01) |
| C09K 11/06 | (2006.01) |
| C09K 11/00 | (2006.01) |
| C09K 11/08 | (2006.01) |

(52) U.S. Cl. ....... 252/301.33; 252/301.36; 252/301.4 R; 252/301.4 F; 252/301.4 P; 252/301.4 S; 252/301.4 H; 252/301.5; 252/301.6 R; 252/301.6 F; 252/301.6 S; 106/31.31; 106/31.29; 106/31.61; 106/31.64; 106/31.15; 106/31.32; 106/31.6; 106/31.62; 106/31.63

(58) Field of Classification Search ............. 252/301.33, 252/301.36, 301.4 R–301.6 P; 106/31.31, 106/31.29, 31.61, 31.64, 31.15, 31.32, 31.6, 106/31.62, 31.63
See application file for complete search history.

(56) References Cited

U.S. PATENT DOCUMENTS

| 5,424,006 | A | * | 6/1995 | Murayama et al. .... 252/301.4 R |
| 5,498,280 | A | * | 3/1996 | Fistner et al. ............... 106/31.64 |
| 5,554,842 | A | * | 9/1996 | Connell et al. ................. 235/491 |
| 5,839,718 | A | * | 11/1998 | Hase et al. ............... 252/301.4 F |
| 5,885,483 | A | * | 3/1999 | Hao et al. ............... 252/301.4 R |
| 6,117,362 | A | | 9/2000 | Yen et al. |
| 6,177,029 | B1 | * | 1/2001 | Kaz et al. ................. 252/301.33 |
| 6,375,864 | B1 | | 4/2002 | Phillips et al. |
| 2004/0164277 | A1 | * | 8/2004 | Yen et al. ............... 252/301.4 R |

* cited by examiner

*Primary Examiner* — Carol M Koslow
(74) *Attorney, Agent, or Firm* — Thomas, Kayden, Horstemeyer & Risley, LLP

(57) ABSTRACT

Phosphor and fluorescent compositions and methods of producing them are provided.

13 Claims, No Drawings

PHOSPHORESCENT/FLUORESCENT COMPOSITIONS AND METHODS

CROSS REFERENCE TO RELATED APPLICATION

The present application claims priority to and the benefit of U.S. non-provisional patent application No. 60/607,007 filed on Sep. 2, 2004, which is incorporated by reference in its entirety.

TECHNICAL FIELD

The present disclosure generally relates to compositions including phosphors and fluorescent materials and methods for their fabrication and use, as well as articles incorporating the compositions of the disclosure.

BACKGROUND

Persistent phosphorescence was discovered in the $11^{th}$ century in China and Japan and in the $16^{th}$ century in Europe (Shionoya, S. (1998) in *Phosphor Handbook*, Shionoya, S; and Yen, W. M.; (eds.), CRC Press, Inc., Boca Raton, New York, p. 3). The phenomenon involves two kinds of active centers, emitters and traps. Emitters are centers capable of emitting radiation after excitation of the center. Traps do not emit radiation, but store excitation energy and release it gradually to the emitter. Emitter centers can be created through the addition of activators, i.e., small amounts of intentionally added impurity atoms or ions, to the host matrix. Co-activators are additional, intentionally-added impurity ions which may affect (improve or modify) the emission of an activator. For example, a co-activator can be added to form trapping centers that can increase the persistence time of the phosphor.

Thermoluminescence and photostimulable phosphorescence are physically governed by mechanisms similar to persistent phosphorescence (Chen, R. and McKeever, S. W. S., (1997), Theory of Thermoluminescence and Related Phenomena, World Scientific, Singapore; Sonoda, M. et al. (1983) Radiology 148:833). The main difference between these three phenomena appears to be the depth of traps. When a phosphor possesses centers with certain trapping depths that can be effectively thermally activated at room temperature, it will show persistent phosphorescence. Deeper trapping centers can be activated by heating or photostimulation. Measurement of the thermoluminescence of phosphor samples can be used to characterize the traps present in the phosphor. Because of mechanistic similarities, a study of phosphorescence dynamics allows the characterization of these three important luminescence processes. Single crystal phosphors facilitate studies of phosphorescence dynamics.

Persistence of phosphorescence is measured herein as persistence time, which is the time, after discontinuing irradiation, that it takes for phosphorescence of a sample to decrease to the threshold of eye sensitivity. This threshold is the signal level of emission intensity that an unaided eye can perceive in the dark. Persistence times are assessed by following phosphorescence intensity as a function of time. Measurement comparisons of persistence times must be performed under identical conditions using the same detection systems.

SUMMARY

Phosphor and fluorescent compositions and methods of producing them are provided. Briefly described, one embodiment of the composition, among others, includes a phosphor that emits radiation in a first range of wavelengths and a fluorescent pigment that fluoresces radiation in a second range of wavelengths. The first range of wavelengths and the second range of wavelengths are substantially the same.

Briefly described, another embodiment of the composition, among others, includes a phosphor that emits radiation and a fluorescent pigment that fluoresces radiation. The composition fluoresces the radiation and emits the radiation in approximately the same range of wavelengths.

Briefly described, one embodiment of the method for producing a composition, among others, includes combining at least one phosphor and at least one fluorescent pigment to form a composition, wherein the composition fluoresces light and emits light at approximately the same wavelength or combination of wavelengths.

Other systems, methods, features, and advantages of the present disclosure will be or become apparent to one with skill in the art upon examination of the following drawings and detailed description. It is intended that all such additional systems, methods, features, and advantages be included within this description, be within the scope of the invention(s), and be protected by the accompanying claims.

DETAILED DESCRIPTION

Embodiments of the disclosure provide compositions containing phosphors (e.g., long-persistent phosphors) in combination with at least one fluorescent pigment and, in other embodiments, at least one non-luminescent pigment. The disclosed compositions are formulated so that the compositions fluoresce radiation energy (e.g., light) in a first range of wavelengths or color and phosphoresce, fluoresce, or emit radiation energy in response to a exciting amount of radiation at approximately the same first range of wavelengths or color. For example, the composition fluoresces and emits radiation energy in the UV region, visible region, IR region, or combinations thereof. Accordingly, one embodiment provides a composition that has the same coloration in ambient lighting and in the dark.

Another embodiment provides a composition having a phosphor, for example a blue long-persistent phosphor, a green long-persistent phosphor, a yellow long-persistent phosphor, a red long-persistent phosphor, or a combination thereof, and a fluorescent pigment, and optionally a non-luminescent pigment. Generally, the fluorescent pigment and the phosphor can be selected so that the combined emission from the composition is the same color or approximately the same color as light reflected (e.g., fluoresce) by the composition.

Another embodiment provides the disclosed compositions in combination with a matrix, a resin, an ink, a fluid, a wax, a paint, a vehicle, a carrier, or combinations thereof. In addition, the compositions can be applied to the surfaces of various types of articles, mixed into plastics, rubber, polyvinyl chloride, other synthetic resins, glass, and the like, and can be used in molded bodies and fluorescent films. The compositions can also find widespread use in articles including, but not limited to: various types of signposts for traffic safety, such as traffic armbands, gloves for traffic control, reflective plates for cars, reflective hand flags, signal devices, highway signs, emergency ropes, footwear, safety umbrellas, canes for the blind, stickers, knapsacks, raincoats, and safety covers; visual indicators such as telephone dial covers, switches, non-skid strips for stairs, indoor guide signs for emergency evacuation, tires, mannequins, fire extinguishers, keys, doors, fluorescent lamps and display tapes; decorations such as artificial flowers, accessories, and interior plates; leisure goods such as fishing floats, toys, golf balls, ropes for dragnets, kites, artificial trees and shrubs, and jigsaw puzzles; timepieces such as clock dials and faces, hands, and gradations; office goods and office automation equipment such as writing equipment, desk pads, rulers, marker pens, seals, liquid crystal backing lights, solar cells, desk top calculators, printers, and ink; educational goods and machinery such as constellation plates, planet models, transparencies, musical instruments with keyboards, and maps; and construction materials such as concrete, guardrails, scales for construction work, metal fittings for manhole footholds, tiles, decorative sheets, surveying equipment and measuring tapes.

As mentioned above, the composition includes, but is not limited to, at least one phosphor in combination with at least one fluorescent pigment. In an embodiment, the phosphor is a long-persistent phosphor. Additional details regarding the phosphors and fluorescent pigments are described below.

In one embodiment, the composition is formulated so that the composition fluoresces radiation energy in a first range of wavelengths, and emits radiation energy (e.g., phosphoresces) in response to an exciting amount of radiation at approximately the same first range of wavelengths. In short, the composition is formulated so that the composition has the same coloration in ambient lighting and in the dark.

In one embodiment, the composition is formulated so that the composition fluoresces radiation energy in a first range of wavelengths, and emits radiation energy (e.g., phosphoresces) in response to an exciting amount of radiation in a different range of wavelengths. In short, the composition is formulated so that the composition has a different coloration in ambient lighting and in the dark.

The range of wavelengths can be in the UV spectrum of wavelengths, visible spectrum of wavelengths, IR spectrum of wavelengths, or combinations thereof, where the wavelengths are known in the art. The wavelength of emission and fluorescence may be the same or may be substantially the same (e.g., the wavelengths are in a portion of the spectrum corresponding the same color). In another embodiment, the wavelength of emission and fluorescence may be in two completely different portions of the spectrum, which may enable the composition to be seen if different radiation energy conditions (e.g., under visible light conditions and under IR radiation conditions).

The formulation of the composition depends, in part, on the end result desired, the fluorescence characteristics, the emission characteristics, the uses for or of the composition, and the like. The components in the composition can be adjusted to accomplish the desired results. Exemplary formulations are provided in the Examples.

Fluorophores

The fluorescent pigments can include, but are not limited to, inorganic fluorescent pigments and organic fluorescent pigments. In addition, the fluorescent pigments such as those that are commercially available and those yet known can be used in the present disclosure. Fluorescent pigments that are described in various publications can be used in the present disclosure. Such publications include: Color Index, compiled by The Society of Dyers and Colourists, Kaitei Shin Han Ganryo Binran (Revised New Handbook of Pigments), compiled by Nippon Ganryo Gijutsu Kyokai (1989), Saishin Ganryo Oyo Gijutsu (Newest Pigment Application Technology), CMC Shuppan (1986), Insatsu Ink Gijutsu (Printing Ink Technique), CMC Shuppan (1984), and W. Herbst and K. Hunger, Industrial Organic Pigments, VCH Verlagsgesellschaft (1993). In addition, fluorescent pigments are available from sources such as Hoechst Celanese Corporation, Paul Ulhlich, BASF, American Hoechst, Ciba-Geigy, Aldrich, DuPont, Ugine Kuhlman of Canada, Dominion Color Company, Magruder, and Matheson, Coleman, Bell, BASF Corporation, Engelhard Corporation, and Sun Chemical Corporation.

The fluorescent pigments can include, but are not limited to, inorganic fluorescent materials and organic fluorescent materials. As for the inorganic fluorescent materials, examples include $MgWO_4$, $CaWO_4$, $(Ca,Zn)(PO_4)_2:Ti^+$, $Ba_2P_2O_7:Ti$, $BaSi_2O_5:Pb^{2+}$, $Sr_2P_2O_7:Sn^{2+}$, $SrFB_2O_{3.5}:Eu^{2+}$, $MgAl_{16}O_{27}:Eu^{2+}$, and inorganic acid salts such as tungstenate and sulfate.

The organic fluorescent materials can include, but are not limited to, rhodamines, fluoresceins, coumarins, naphthalimides, benzoxanthenes and acridines. In particular, the organic fluorescent materials can include, but are not limited to, acridine orange, amino acridine, quinacrine, anilinonaphthalene sulfonate derivatives, anthroyl oxystearic acid, auramine O, chlorotetracycline, cyanine dye such as merocyanine and 1,1'-dihexyl-2,2'-oxacarboxycyanine, dansyl sulfonamide, dansyl choline, dansyl galacside, dansyl tolidine, dansyl chloride derivatives such as dansyl chloride, diphenyl hexatriene, eosin, adenosine, ethidium bromide, fluorescein, foamycine, 4-benzoylamide-4'-aminostilbene-2,2'-sulfonic acid, naphthyl triphosphic acid, oxonol dye, parinaric acid derivatives, perylene, N-phenylnaphthyl amine, pyrene, safranine O, fluorescamine, fluorescein isocyanate, 7-chloronitrobenzo-2-oxa-1,3-diazole, dansylaziridine, 5-(iodoacetamide ethyl) aminonaphthalene-1-sulfonic acid, 5-iodoacetamide fluorescein, N-(1-anilinonaphthyl 4) maleimide, N-(7-dimethyl-4-methylcumanyl) maleimide, N-(3-pyrene) maleimide, eosin-5-iodoacetamide, fluorescein mercury acetate, 2-[4'-(2''-iodoacetamide)]aminonaphthalene-6-sulfonic acid, eosin, Rhodamine derivatives, organic electroluminescent dye, organic electroluminescent polymer, organic electroluminescent crystal and dendrimer.

In addition, the organic fluorescent materials can include, but are not limited to, Pigment Yellow 13, Pigment Yellow 73, Pigment Yellow 74, Pigment Yellow 83, Pigment Yellow 93, Pigment Yellow 94, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 32, Pigment Violet 37, Basic Red 1, Basic Violet 10, Basic Violet 11, Basic Violet 16, Basic Yellow 40, Solvent Yellow 44, Solvent Yellow 131, Solvent Yellow 135, and 3,6-di(4'-cyano-phenyl)-2,5-dihydro-pyrrolo[3,4-c]pyrrole-1,4-dione or 3-phenyl-6-(4'-tert-butyl-phenyl)-2,5-dihydro-pyrrolo[3,4-c]pyrrole-1,-4-dione.

Phosphors

As used herein, "long-persistent phosphor" includes materials having persistence times exceeding 2 hours. It is generally the case that phosphors having longer persistence times are more preferred. In some embodiments, the phosphor materials, including single crystals and single crystal fibers, exhibit phosphorescence persistence times of greater than about 3-5 hrs, greater than about 10-12 hrs, or greater than about 15-18 hrs.

A phosphor may have an emission spectrum such that its phosphorescence falls largely within a particular color range or range of wavelengths. In particular, the phosphorescence may fall in the visible wavelength region. For example, if the phosphor emits primarily in the blue range, the phosphor may be called a blue phosphor. Approximate color ranges in the visual spectrum are as follows: violet or deep blue (about 390-455 nm), blue (about 455-492 nm), green (about 492-577 nm), yellow (about 577-597 nm), orange (about 597-622 nm), red (about 622-770 nm) (Academic Press Dictionary of Science and Technology, ed C. Morris, 1992, Academic Press, San Diego, pp. 282, 958, 1527, 1814, 2334, and 2388). Approximate near infrared ranges are about 770 nm to about 5000 nm. In an embodiment, the phosphor and fluorescent pigment are selected to emit/reflect radiation energy at about the same or the same wavelength. In another embodiment, the phosphor and fluorescent pigment are selected to emit/fluoresce radiation energy at different wavelengths.

It is possible for one ion to transfer energy to another. If two different ions are involved in energy transfer, the ion transferring the energy can be called a donor or sensitizer, while the ion receiving the energy can be called the acceptor (G. Blasse and B. C. Grabmaier, (1994) Luminescent Materials, Springer-Verlag, Berlin, p 91). Accordingly, other embodiments of the disclosure provide compositions including a donor system and an acceptor system, wherein the donor system transfers energy, for example electromagnetic energy, to an acceptor. The acceptor system can then emit electromagnetic energy at a wavelength that differs from the wavelength of energy absorbed from the donor system. Some embodiments of the disclosure include a donor system that is excitable with a wavelength of electromagnetic energy at near-ultraviolet wavelengths. The donor system and one or more optional co-activators are selected so that, in the presence or absence of an acceptor system, the phosphor composition emits energy to produce a long lasting afterglow or phosphorescence.

In another embodiment, the introduction of an acceptor system does not fundamentally alter the behavior of the donor system, i.e., the temporal, frequency, and/or wavelength properties of the original donor system emission remain the same. However, in the presence of the acceptor system, energy stored in the donor system is transferred to the acceptor system and re-emitted at a frequency characteristic of the acceptor system. In still another embodiment, the visible energy emitted by the phosphor is regulated, controlled, or modulated by the acceptor ion or is solely or predominantly emitted by the acceptor ion. Since the excitation energy stored in the donor system persists for an extended period of time, the transfer between the donor system and the acceptor system continues over an extended period of time, and the ensuing process can be described as being persistent energy transfer. As a result, the emission from the acceptor system in some embodiments lasts for as long as the energy in the donor system persists. The acceptor system can emit at a lower or down-converted frequency or at a higher or up-converted frequency compared to the donor system. However, for donor ions that emit in the blue or deep blue wavelengths, down-conversion of the donor frequency allows a greater range of frequencies in the visible range.

Exemplary acceptor systems include an acceptor ion that is incorporated into a host material, for example through doping of the host material. The acceptor is an activator and is selected to provide characteristic emission at a desired emission frequency. Suitable donor systems include a combination of host material and a donor ion. For example, the donor ion can be incorporated into the host material through doping. In a given phosphor composition, the donor ion can be different from the acceptor ion. The donor ion can be an activator that is capable of emitting electromagnetic energy, for example light, after being exposed to an exciting amount of radiation, for example electromagnetic radiation.

Other embodiments provide phosphor compositions having one or more optional co-activator dopant ions in addition to the donor ion and acceptor ion. For example, additional dopant ions may form trapping centers within the host. Typically, the co-activator ion is different from the acceptor and donor ions. The combination of the host material, the donor ion, and the optional co-activator ion(s) is selected so that the combination is capable of forming a long-persistent phosphor emitting at a first wavelength. If the first wavelength is in the visible range, the first wavelength corresponds to a first color. Furthermore, the donor ion is selected such that energy transfer can occur from the donor ion to the acceptor ion. Typically, the afterglow of phosphor compositions of some embodiments is largely characteristic of the acceptor ion.

The acceptor ion in the phosphor composition can receive energy from the donor ion and emit energy at a second wavelength. The energy emitted by an acceptor ion is typically a physical property of the acceptor ion. Accordingly, various acceptor ions can be combined with a host matrix or a doped host matrix to provide a phosphor composition that emits energy at a desired wavelength. The second wavelength may correspond to a second color in the visible range. Preferably, the first wavelength that can be emitted by the donor is different from the second wavelength emitted by the acceptor. Alternatively, a first phosphor composition having a first emission color and second phosphor composition having a second emission color can be combined to produce a composition having a third emission color. Typically, the combined phosphors have approximately equivalent decay rates.

In an exemplary embodiment, there is a visible difference between the first wavelength emitted by the donor ion and the second wavelength emitted by the acceptor ion. By "largely characteristic of the acceptor ion," it is meant that most of the electromagnetic energy, for example visible electromagnetic energy such as light, emitted from the phosphor (i.e., more than about 50%) is characteristic of the acceptor ion. In some embodiments, the percentage of light emitted from the phosphor compositions characteristic of the acceptor ion may be more than about 75% to more than about 90%. In still other embodiments, if the afterglow is solely characteristic of the acceptor ion, at least about 90% of the light emitted from the phosphor is characteristic of the acceptor ion. The amount of light emitted from the phosphor that is characteristic of the acceptor ion can be calculated from measurements of afterglow intensity at the relevant wavelengths (e.g., through analyzing a spectrum of afterglow intensity versus wavelength). The details of such an analysis are known to those skilled in the art of spectroscopy.

It should be noted that the energy transfer process arises from interactions between a donor and an acceptor system and can occur radiatively or non-radiatively. Typically, the energy transfer of the compositions occurs under ambient temperature and pressure. In radiative transfer, the electromagnetic energy emitted by the donor ion, for example a photon, is absorbed directly by the acceptor ion. In non-radiative transfer, the energy may be transferred directly between the ion centers and no light need be emitted. Sometimes energy transfer processes require the absorption or emission of lattice vibrational quanta (phonons) to conserve energy. Energy transfer processes have been reviewed in depth by Morgan and Yen (Topics in Applied Physics Vol. 65, "Laser Spectroscopy in Solids II", W. M. Yen, ed., Springer-Verlag, Berlin 1989, pp. 77-119). Typically, the chosen acceptor ion has absorption transitions in coincidence with the energy of the emitted radiation of the donor system.

The phosphors can include phosphors such as those that are commercially available as well as those yet to be developed. In particular, the phosphors can include long-persistent phosphors such as those described in U.S. Pat. Nos. 6,267,911 and 6,117,362, U.S. patent application Ser. No. 10/374,696 (publication number 20040164277), and International Patent Application No. PCT/US04/05426, each of which are incorporated herein by reference.

In an exemplary embodiment the long-persistent phosphors can include, but are not limited to, the phosphors in Examples A, B, and C.

PHOSPHORS, EXAMPLE A

Embodiments of the present disclosure include long-persistent phosphors such as those that emit electromagnetic energy when incorporated into the host material (composition) and are described by the general formula:

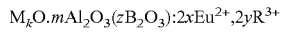

where $k=1-2x-2y$, m is a number ranging from about 1.6 to about 2.2, x can range from about 0.0001 to about 0.05 and is preferably about 0.001 to about 0.005, the value of y can range from about 0.0001 to about 0.10 and is preferably equal to the value of x, and z can range from about 0.02 to about 0.2. M is most generally an alkaline earth metal, but is preferably Sr or a mixture of Sr with Ca, Ba, or both. $R^{3+}$ is generally one or more trivalent metal ions, but is preferably a trivalent metal ion such as: $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, $Yb^{3+}$, and $Bi^{3+}$. Preferred trivalent codopants are $Pr^{3+}$, $Ho^{3+}$, $Dy^{3+}$, and $Nd^{3+}$. In one embodiment, co-doping of $Dy^{3+}$ or $Y^{3+}$ along with other trivalent metal ions improves brightness of the phosphor.

Long-persistent phosphors can also include those in which two trivalent metal ions are doped into the matrix and having the general formula:

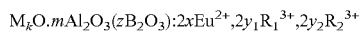

where $k=1-2x-2y$, m is as defined above, $y_1+y_2=y$, and $R_1$ and $R_2$ are two different trivalent metal ions. The number x can range from about 0.0001 to about 0.05 and is preferably about 0.001 to about 0.005. The value of y can range from about 0.0001 to about 0.10 and is preferably equal to the value of x, and z can range from about 0.02 to about 0.2. Preferred phosphors contain about equal amounts of $R_1$ and $R_2$.

Long-persistent phosphors can also include those in which $Al^{3+}$ in the host is substituted by a divalent metal ion, particularly $Mg^{2+}$ or $Zn^{2+}$. These phosphors have the general formula:

where $k=1-2x-2y$, m is as defined above, x can range from about 0.0001 to about 0.05 and is preferably about 0.001 to about 0.005, y can range from about 0.0001 to about 0.10 and is preferably equal to the value of x, and z can range from about 0.02 to about 0.2. XO is a metal oxide, preferably MgO or ZnO, and q can range from about 0.0001 to about 0.20. The amount of divalent ion (q) from XO added to the matrix to replace $Al^{3+}$ is preferably equal to the amount of $R^{+3}$ doped into the matrix (i.e., the value of q preferably equals the value of 2y).

Long-persistent phosphors can include those in which $M^{2+}$ in the host is substituted by a monovalent alkali metal ion, particularly $Na^+$ or $K^+$. These phosphors have the general formula:

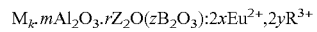

where $k=1-2x-2y-2r$, m is as defined above, x can range from about 0.0001 to about 0.05 and is preferably about 0.001 to about 0.005, y can range from about 0.0001 to about 0.10 and is preferably equal to the value of x, and z can range from about 0.02 to about 0.2. $Z_2O$ is an alkali metal oxide, preferably $Na_2O$ or $K_2O$, and r can range from about 0.0001 to about 0.20. The amount of monovalent ion (2r) added to the matrix to replace $M^{2+}$, is preferably equal to the amount of $R^{3+}$ doped into the matrix (i.e., the value of r preferably equals the value of y). A slight excess over the desired or preferred amount of $Z_2O$ may be added to compensate for any $Z^+$ that may be vaporized during sintering.

PHOSPHORS, EXAMPLE B

Embodiments of the present disclosure include long-persistent phosphors such as those that emit electromagnetic energy when incorporated into the host material (composition) and having the general formula:

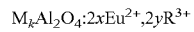

where $k=1-2x-2y$; x can range from about 0.0001 to about 0.05 and is preferably about 0.001 to about 0.02; y can range from about 0.0001 to about 0.15 and is preferably equal to 2x; M is most generally an alkaline earth metal but is preferably Sr or a mixture of Sr with Ca or Ba or both Ca and Ba; R is generally one or more trivalent metal ions but is preferably a trivalent metal ion selected from the group: $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^3+$, $Yb^{3+}$, $Bi^{3+}$ and combinations thereof. The preferred trivalent metal ion dopant is $Dy^{3+}$ or its combination with $Y^{3+}$.

Although not wishing to be bound by any particular theory, it is believed that long persistence time is obtained by creating proper trapping centers in the matrix. Such trapping centers can store excitation energy and release it gradually to the emitter.

Doping of trivalent metal ions, particularly trivalent rare earth metal ions and the Group VA metal ion $Bi^{3+}$, can improve phosphorescence brightness and persistence time. Dopants for creating trapping centers include trivalent rare earth metal ions: $Pr^{3+}$, $Ho^{3+}$, $Nd^{3+}$, $Dy^{3+}$, $Er^{3+}$, $La^{3+}$, $Lu^{3+}$, $Ce^{3+}$, $Y^{3+}$, $Sm^{3+}$, $Gd^{3+}$, $Tb^{3+}$, $Tm^{3+}$, and $Yb^{3+}$, and trivalent $Bi^{3+}$.

Embodiments of this disclosure show that energy efficiency, brightness, and/or persistence time of phosphors are improved by addition of charge compensators to the host matrix. In addition, the use of charge compensators reduces the occurrence of quenching centers originating from various defects, such as color centers, which will reduce or kill luminescence. Embodiments also include those in which a portion of $Al^{3+}$ in the host is replaced with divalent ions, such as $Mg^{2+}$ or $Zn^{2+}$, and those in which a portion of the alkaline earth metal ion ($M^{2+}$) is replaced with a monovalent alkali metal ion, such as $Li^+$, $Na^+$, $K^+$, $Cs^+$, or $Rb^+$. These monovalent and divalent ions are believed to act as charge compensators.

PHOSPHORS, EXAMPLE C

Embodiments of the present disclosure include persistent energy transfer phosphors having an acceptor ion selected from rare earth ions, transition metal ions, or heavy metal ions that emit electromagnetic energy when incorporated into the host material (composition). Suitable acceptors include, but are not limited to, $Pr^{3+}$, $Nd^{3+}$, $Eu^{3+}$, $Tb^{3+}$, $Er^{3+}$, $Tm^{3+}$, $Ti^{2+}$, $Cr^{3+}$, $Mn^{2+}$, $Ni^{2+}$, $Pb^{2+}$, and $Bi^{3+}$. The acceptor ion can be selected to emit at a desired wavelength when combined with a host matrix and, optionally, at least one co-activator.

Exemplary persistent energy transfer phosphor compositions include a donor emitter ion selected from divalent or trivalent rare earth (lanthanide) ions, actinide ions, ions of Groups IV-A and V-A elements in low oxidation states, or combinations thereof. Useful actinide ions include uranium and thorium ions. Concentrations of Th and U are typically very low to minimize environmental concerns. Useful ions of Groups IV-A and V-A elements in low oxidation states include $Pb^{2+}$, $Sb^{2+}$, $Sn^{2+}$, and $Bi^{3+}$. Suitable donor emitter ions include, but are not limited to, $Ce^{3+}$, $Pr^{3+}$, $Sm^{3+}$, $Eu^{2+}$, $Dy^{3+}$, and $Yb^{3+}$. In one embodiment, a donor emitter ion is selected so that it is different from the acceptor emitter ion.

Still another embodiment provides persistent energy transfer phosphors having a co-activator ion selected from divalent or trivalent rare earth (La—Lu) ions, actinide (Ac—Lr) ions, ions of Groups IV-A and V-A elements in low oxidation states, or combinations thereof. Useful actinide ions include uranium and thorium ions. Useful ions of Groups IV-A and V-A elements in low oxidation states include $Pb^{2+}$ and $Bi^{3+}$. Co-activator ions may be selected from the group including, but not limited to: $Pr^{3+}$, $Ho^{3+}$, $Nd^{3+}$, $Dy^{3+}$, $Er^{3+}$, $La^{3+}$, $Lu^{3+}$, $Ce^{3+}$, $Eu^{3+}$, $Y^{3+}$, $Sm^{3+}$, $Gd^{3+}$, $Tb^{3+}$, $Tm^{3+}$, and $Yb^{3+}$ and $Bi^{3+}$. Especially useful co-activator ions include, but are not limited to, $Dy^{3+}$, $Tm^{3+}$, or $Y^{3+}$.

In other embodiments, the host material is selected from alkaline earth aluminates, alkaline earth silicates, alkaline earth aluminosilicates, or combinations thereof. A generalized formula for the host material can be written $M_vAl_xSi_yO_z$. In this formula, M is an alkaline earth element, v and z>0, x≧0 and y≧0, such that one of x and y is not zero (x+y >0). M may include one or more elements selected from Mg, Ca, Sr, and Ba.

Suitable alkaline earth aluminates include, but are not limited to, materials where y is zero and x and z are even numbers including, but not limited to, $MAl_2O_4$ and $MAl_4O_7$.

Suitable alkaline earth silicates include, but are not limited to, materials where x is zero, including, but not limited to, $MSiO_3$. M may be a single alkaline earth element.

Suitable alkaline earth aluminosilicates include, but are not limited, to $M_2Al_2SiO_7$.

As referred to herein, the concentration of a dopant such as an acceptor emitter, a donor emitter, and a co-activator is measured in terms of mol % relative to the alkaline earth element; M. A general formula for the host material incorporating an acceptor ion A, a donor ion D, and a co-activator C can be written $M_vAl_xSi_yO_z$: dD, cC, aA. In this formula, a is the concentration of dopant A, c is the concentration of co-activator C, and d is the concentration of dopant D. Values of a and d are greater than zero and range up to about 10%. Suitable values of a and d are between about 0.5% and about 2%. Since a co-activator is optional, values of c range from about zero to about 10%. Suitable values of c range from about 0 to about 5%. In one embodiment, the concentration of D and A ions determines the rate at which the transfer of energy occurs in the phosphor compositions. The appropriate concentration can be optimized by increasing the A concentration until the phosphorescence attributable to D is reduced completely or to a specified minimum. Standard methods of chemical analysis can be used to measure the amounts of activator, co-activator, and dopant.

Useful materials for the disclosure include, but are not limited to: $MAl_2O_4$:$dCe^{3+}$,$aTb^{3+}$; $MAl_2O_4$:$dCe^{3+}$, $aMn^{3+}$; $MAl_2O_4$:$dEu^{2+}$, $aMn^{3+}$; $M_2Al_2SiO_7$:$dCe^{2+}$, $aMn^{2+}$; and $MSiO_3$:$dEu^{2+}$, $aMn^{2+}$, $cDy^{3+}$. M, d, a, and c are as defined above. M is typically Mg, Ca, Sr, or Ba. Exemplary values of a and d are between about 0.5% and about 2%, while exemplary values of c are between 0 and about 5%.

The disclosure also provides a method for generating long-persistent phosphorescence at a selected color. The method comprises the steps of: selecting at least a first activator capable of producing long-persistent phosphorescence of a first color when incorporated with optional co-activators into a host; selecting at least a second activator capable of producing long-persistent phosphorescence of the selected color when incorporated into the host with the first activator and the optional co-activators, the second activator being capable of accepting optical energy from the first activator; fabricating a long-persistent phosphor comprising the second activator, the first activator and optional co-activators incorporated into the host; and irradiating the long-persistent phosphor, thereby producing long-persistent phosphorescence of the selected color, wherein the first activator, the second activator, and the optional co-activators are all different ions and where the first color is different from the selected color. Therefore, one embodiment of the disclosure provides a method for the modification of the color emitted by a long persistent phosphor by adding an additional activator which emits at the desired color and which can act as an acceptor in energy transfer. Still another embodiment provides for the modification of the persistence length of a known non-persistent phosphor by adding an additional activator that is capable of producing long-persistent phosphorescence in the host and that is capable of acting as a donor.

Still other embodiments include: (i) a mixture of at least two phosphors that emit primary colors to form a secondary color emitting phosphor; (ii) a mixture of three phosphors that emit three different primary colors to yield a white-light emitting phosphor; and (iii) compositionally unbalanced mixtures of "primary" phosphors, rendering a resulting emission with a shade of the highest concentration phosphor. The relative proportion of phosphors can be adjusted to obtain an emission at a desired secondary color.

Primary colors of light are the minimum number of colors that can be mixed to make the greatest number of other colors of light and include red, blue, and green. The primary colors of light differ from the primary colors for pigment. Secondary colors of light are colors formed by combining one or more primary colors of light. Combining red light with blue light produces magenta, blue and green light produce cyan, and green and red light produce yellow light. By varying the amount or proportions of one primary color in a mixture of primary colors, different shades of a secondary color may be obtained. Combining the three primary colors of light in equal proportions produces white light. Thus, a phosphor composition including a phosphor that emits blue, a phosphor that emits green, and a phosphor that emits red in equal proportions results in an overall emission that is perceived as white light.

An intermediate color can be produced by blending a primary color with a secondary color. It will be appreciated that long-persistent phosphor compositions emitting intermediate colors can be obtained by combining a phosphor emitting a primary color with a phosphor emitting a secondary color.

The disclosed phosphor compositions can be used to store information for at least as long as the luminescence persists. For example, the phosphor compositions can be configured to receive an exciting amount of energy, for example, from ultraviolet, near ultraviolet, laser, or an electron beam source. The exciting amount of energy can be applied in a specific pattern onto a surface containing the disclosed phosphors. The resulting luminescence will reproduce the pattern of the exciting energy. Exemplary patterns include, but are not limited to, text, symbols, graphics, bar codes, binary information, identifiers, and numerical information. Because the luminescence is temporary, surfaces containing the disclosed phosphors can be used repeatedly for temporary storage of data. Additionally, a surface can have one or more of the disclosed long persistence phosphors in a predetermined pattern. For example, phosphors emitting different colors can be placed in different positions on or in the surface.

Yet another embodiment provides a method for making a long-persistent phosphor comprising the steps of (a) combining at least one source material for a host, at least one source material for a donor ion, at least one source material for an acceptor ion, and, optionally, at least one source material for a co-activator; and (b) sintering the combined source materials in a reducing atmosphere. In another embodiment, the source material is equivalent to the phosphor component.

In general, powders of the disclosed phosphors are obtained by sintering mixtures of chemicals approximately according to the stoichiometry of the phosphor formula at temperatures and atmospheric conditions that produce such materials. However, in some cases a slight (approximately 1-3%) excess of a particular component can be used for a different quality of the phosphor. For example, an excess of CaO may improve the quality of calcium-containing phosphors.

Still another embodiment provides phosphor compositions including a host doped with cerium to form long-persistent phosphors. The cerium may act alone as an activator or may act as a donor in a persistent transfer phosphor. A general formula for exemplary cerium doped phosphors in which the cerium acts alone as the activator may be written as $M_vAl_xSi_yO_z:nCe^{3+}$, where M is an alkaline earth metal element such as Mg, Ca, Sr, and Ba, v>0, x≧0, y≧0, x+y>0, z>0, and n is the concentration of the cerium ion. As referred to herein, the concentration of a dopant such as cerium is measured in terms of mol % relative to the alkaline earth element, M (mol % per mole of element M). Suitable concentrations of n include concentrations greater than 0 and less than or equal to about 10%, more typically concentrations are from about 1% to about 2%. Representative long-persistent cerium doped aluminates ($MAl_2O_4:Ce^{3+}$) are disclosed that emit in the range from deep blue to blue to green. Other disclosed phosphors doped with cerium emit in the range of red to infrared.

One embodiment of the present disclosure that provides an approximate formula for a long-persistent phosphor activated by cerium alone is:

$$M_vAl_xSi_yO_z: nCe^{3+} \quad (I)$$

or

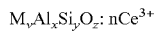
$$vM0·(x/2) Al_2O_3·y(SiO_2): nCe^{3+} \quad (II)$$

wherein M is an alkaline earth metal v>0, x≧0, y≧0, x+y>0, z>0, and n is between about 0.1% and 5%.

In an embodiment, the long-persistent phosphor can be represented by the formula: $M_vAl_xSi_yO_z:nCe^{3+}$, where M is an alkaline earth metal element, v>0, x>0, y>0, x+y>0, z>0, and n is the concentration of the cerium ion in terms of mol % relative to the alkaline earth element, M (mol % per mole of element M), and the concentration of n is greater than 0 and less than or equal to about 10%.

As another example, an approximate formula for a long-persistent energy transfer phosphor incorporating a donor (D), an optional co-activator (C) and an activator (A) is:

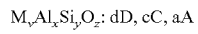
$$M_vAl_xSi_yO_z: dD, cC, aA$$

or

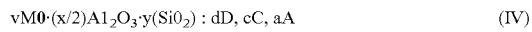
$$vM0·(x/2)Al_2O_3·y(SiO_2) : dD, cC, aA \quad (IV)$$

wherein M is an alkaline earth metal, D is a donor ion, A is an acceptor ion, C is a co-activator ion, v>0, x≧0, y≧0, x+y≧0, z>0, 0<d≧10%, and 0<a 10%, and 0<10%.

For the above formulas, useful sources of the host material can include, but are not limited to, alkaline earth metal carbonates, alumina, and silica, or combinations thereof. Useful sources of the acceptor ion A, donor ion D, and co-activator ion C are oxides and carbonates capable of providing the relevant ion. Additional useful sources of the host material, acceptor ion, donor ion, and co-activator ion are known in the art.

When the phosphor is not to be made in single crystal form, the mixture of chemicals preferably also contains a flux. The flux is important to the formation of the luminescence phase. The flux is used to improve the solid state chemical reaction. Suitable fluxes include $B_2O_3$ and $H_3BO_3$ and their commercially available hydrates. Useful amounts of $B_2O_3$ are in the range of about 0.02% to about 8%, typically with the range about 1 to about 5%. $B_2O_3$ can be replaced in all formulations of this disclosure by an amount of $H_3BO_3$ sufficient to provide an equivalent molar amount of B (e.g., $2H_3BO_3$ can replace each $B_2O_3$). The flux may or may not be removed after sintering is complete. The flux may be removed by methods known in the art (e.g. washing with hot water).

Phosphor Combinations

In some embodiments, the phosphorescence of the persistent energy transfer phosphor of the disclosure is independent of the phosphor being immersed into a matrix that does not substantially react with the phosphor (e.g., enamels, waxes, varnishes, paints, and polymers). Therefore, certain embodiments of the persistent energy transfer phosphors can be used in the manufacture of phosphorescent articles that incorporate the phosphors into a suitable matrix, typically a transparent or translucent matrix. The disclosed phosphor compositions can be combined with additional materials such as a carrier or vehicle to produce, for example, a composite, laminate, mixed material, blended material, suspension, colloid, fluid, spray, gel, wax, crystal, film, or mist that retains the phosphorescent properties of the particular phosphor composition used. Exemplary materials that can combined with the disclosed phosphors include, but are not limited to a matrix, resin, powder, or fluid.

The additional material that can be combined with the disclosed phosphor compositions is typically translucent and does not significantly absorb energy needed to excite the phosphor or absorb energy emitted from the phosphor. For example, pigment-containing material combined with the phosphor can be selected so that the pigments do not absorb the excitation energy needed to excite the phosphor or do not absorb the energy emitted by the phosphor. In such case, the pigment can typically be chosen to fluoresce at the same color that is emitted by the phosphor. Combinations of phosphors with pigments of a color other than that emitted by the phosphor can be used to produce a third color, which is different from the both the phosphor emission and the pigment.

Additionally, the material can be selected to minimize a decrease in efficiency of the emitter due to thermal effects, i.e., during the process of conversion of UV radiation into visible radiation. Some of the incident energy can be transferred to the matrix by vibrations of the phosphor that coincide in energy with vibrations of the matrix. Molecular (matrix) and reticular (phosphor) vibrations occur in the infra-red portion of the spectrum. This region is characterized by heat radiation associated with atomic and molecular motions. This system crossover is rather common and should be considered for all blends.

In some embodiments, the materials combined with the disclosed phosphor compositions typically do not detrimentally react with the phosphor, for example causing degradation of the phosphor or phosphor properties. Suitable non-reactive materials include, but are not limited to, polymers, organic solvents, paint, resin, ink, coloring agents, natural or synthetic polymers such as nylons, urethanes, acrylics, carbohydrates, proteins, aliphatic hydrocarbons, lipids, wax, fatty acids, plastics, thermoplastics, elastomers, thermoelastomers, polypropylene, polyethylene, branched aliphatic hydrocarbons, fluoropolymers, silicones, and/or polysiloxanes.

Composition Applications

As mentioned above, the composition including the phosphor and the fluorescent pigment can be included in a matrix, a resin, a fluid, a wax, a paint, a vehicle, a carrier, or a combination thereof. As such, the composition can be included in many applications, as described previously. For example, the composition can be used in writing implements (e.g., crayons), paints, resins, polymers (e.g., thermosetting polymers and thermoplastic polymers), and the like. The composition can be mixed with other components, with the resultant mixture having the characteristics of the composition.

Writing Implements

Generally, the phosphorescent/fluorescent composition is incorporated into writing implements that can apply the composition to a surface, for example a crayon or other writing implement. One embodiment of the present disclosure provides crayons composed of a clear synthetic resin (matrix) and one or more of the disclosed compositions dispersed therein. The compositions are generally in the form of powders insoluble in a dispersion medium. The proportion of the composition in the crayon can be modified according to the kind of composition and other factors but is usually about 0.1-30 weight %, preferably 1-20 weight %.

The disclosed writing implements can also contain a gelling agent. The gelling agent can be those used in conventional gel crayons. For example, at least one gelling agent from the dibenzylidenesorbitol and tribenzylidenesorbitol series of compounds can be used. Thus, at least one member selected from the group consisting of dibenzylidenesorbitol, tribenzylidenesorbitol, and their derivatives can be employed.

The dibenzylidenesorbitol derivatives mentioned above include, but are not limited to, compounds available upon substitution of the benzene nucleus of each benzylidene group of dibenzylidenesorbitol with a $C_{1-3}$ alkyl group in an optional position, thus including such species as [di(p-methylbenzylidene)]sorbitol, [di(methylbenzylidene)]sorbitol, and [di(p-chlorobenzylidene)]sorbitol, among others. The above-mentioned tribenzylidenesorbitol derivatives include, but are not limited to, compounds available upon substitution of the benzene nucleus of each benzylidene group of tribenzylidenesorbitol with a $C_{1-3}$ alkyl group in an optional position, thus including such species as [tri(p-methylbenzylidene)]sorbitol, [tri(methylbenzylidene)]sorbitol, and [tri (p-chlorobenzylidene)]sorbitol, among others.

The amount of the gelling agent in the crayon can be judiciously selected according to the kind of gelling agent, but may be usually about 2-12 weight % and preferably about 3-8 weight %. If the gelling agent is used in an excessive proportion, the gel may become so hard that the coloring power of the crayon may deteriorate. If the proportion of the gelling agent is too small, gelation will not occur easily.

In some embodiments, an organic solvent can be used so long as it does not interfere with the properties of the composition, and known organic solvents can be used. Among such known solvents, monohydric alcohols, glycols, glycol ethers, and their esters may be used with advantage in the present disclosure. The monohydric alcohol includes, but is not limited to, ethanol, methanol, and isopropyl alcohol. The glycol includes, but is not limited to, ethylene glycol, propylene glycol, diethylene glycol, dipropylene glycol, and hexylene glycol. The glycol ether includes, but is not limited to, glycol methyl ethers, glycol ethyl ethers, glycol propyl ethers, and glycol butyl ethers.

The proportion of the organic solvent in embodiments of the disclosed crayon can be selected in relation to the composition and other components, but are usually about 20-80 weight %, preferably 30-65 weight %. If the organic solvent is excessive, gelation may not occur. On the other hand, if the amount of the organic solvent is too small, the other components will not be sufficiently dissolved to obtain a homogeneous gel.

The resin component is not particularly restricted in kind but the various resins that are used in the gel crayon or the like can be employed. One or more resins can be used, alone or in combination, including, but not limited to, a film-forming resin and an adhesion-improving resin.

The film-forming resin is not particularly restricted in kind, so long as it is capable of enhancing the hardness of the phosphorescent crayon and forming a tough film on the substrate surface. Thus, for example, cellulosic resins such as cellulose acetate butyrate, ethylcellulose, acetylcellulose, etc. and vinyl resins such as polyvinyl butyral, polyvinyl acetate, vinyl acetate-vinyl chloride copolymer resin, vinyl acetate-ethylene copolymer resin, etc. can be used. Those resins can be used each independently or in a combination of two or more species. Among the above-mentioned resins, polyvinyl butyral resins with an acetyl content of 5% or less, a hydroxyl content of 18-27%, a butyral content of 69% or more, and a degree of polymerization in the range of 300-2000 are particularly suitable.

The adhesion-improving resin is not particularly restricted in kind, either, provided that it is capable of improving adhesion to the substrate surface. Thus, for example, ketone resin, xylene resin, and amide resin can be used. The ketone resin can, for example, be the product of condensation between cyclohexanone and formaldehyde. The xylene resin may, for example, be the product of condensation between m-xylene and formalin. The amide resin may, for example, be a thermoplastic resin available upon polycondensation of a dimer acid and a di- or polyamine and having a molecular weight of about 4000 to 9000. Such adhesion improving resins can also be used each independently or in a combination of two or more species.

The proportion of the resin component in the crayon should vary with different kinds of resins but may be generally about 3-40 weight % and preferably 6-35 weight %. If the resin component is excessive, the gel may become so hard that the coloring power of the crayon may deteriorate. If the amount is too small, gelation will be difficult to occur.

The formulating amounts of said film-forming resin and adhesion-improving resin can also be selected in relation to the other components, but the recommended ratio of film-forming resin to adhesion-improving resin is about 1:0.1-5 by weight, preferably 1:0.2-3 by weight.

Embodiments of the disclosed crayon can include other known additives such as a colorant, filler, leveling agent, viscosity modifier, thixotropic agent, dryness imparting agent, etc. in suitable amounts where necessary. Moreover, a plasticizer such as diethyl phthalate, dibutyl phthalate, dioctyl phthalate, 2-ethylhexyl epoxyhexahydrophthalate, 2-ethylhexyl sebacate, tricresyl phosphate, etc. can also be incorporated in a suitable amount.

The gel strength of the crayon can be set according to the intended use for the end product, but is generally set at about 5-50 kg/cm$^2$ and preferably at about 7-30 kg/cm$^2$. The gel strength can be modified by varying the kinds and formulating amounts of the organic solvent and/or gelling agent, for instance.

The method for production of one embodiment of the crayon comprises blending the above-mentioned components uniformly. A typical procedure comprises dissolving the film-forming resin, etc., in an organic solvent, optionally dispersing a colorant thoroughly in the solution using a mill or the like, dissolving the organic solvent and adhesion-improving agent, and dispersing the composition therein, casting the final solution in a mould having a desired profile, and cooling the contents to solidify in situ. In carrying out the above procedure, heat may be applied for dissolving the respective components.

Phosphorescent Paints

Another embodiment of the present disclosure provides a paint composition including one or more of the disclosed compositions. The paint compositions can be water soluble or oil-based. Water soluble compositions can contain a water miscible or compatible resin, for example a polyurethane resin. The polyurethane resin (e.g., an acrylic urethane resin in either a semi-gloss or gloss) used in the composition can be a thermoplastic polymer derived or produced by the reaction of a polyisocyanate such as a diisocyanate (toluene diisocyanate) and a hydroxyl-containing material, for example, a polyol derived from propylene oxide or trichlorobutylene oxide and containing a water soluble group such as hydroxy, carboxylic acid or amine group. The amount of water miscible polyurethane resin (semi-gloss or gloss) used ranges from about 1% to about 80%, with a preferred range from about 3% to about 75%, more preferred from about 5% to about 70%, and a most preferred from about 10% to about 65% by volume of the paint composition.

The water-based dispersions employed in the present disclosure also can be used in commercially produced water-based paints containing various colors used, for example, in painting highway roadway surfaces including white, yellow, orange, red, blue, and green. These types of paints may, for example, be used as a highway paint colored with appropriate highway or roadway colors such as white (titanium dioxide [ASTM D476, Type II] 100% purity), yellow (medium chrome yellow [ASTM D211, Type III] 100% purity), orange, and blue. The water-based, colored dispersion represents from about 30% to about 98%, typically a range being from about 40% to about 95%, more typically a range from about 50% to about 90%, and most typically a range from about 55% to about 88% by volume of the water-based paint composition.

The selection of the amount of composition, colored paint dispersion, and polyurethane resin from within the ranges discussed above, is determined, for example, by the desired color of the paint dispersion. Yellow paints require increased amounts of composition in comparison to white paints. The selected ranges permit a careful balance of the water-based compositions with other paint ingredients resulting, for example, in a highway paint composition with maximum desirable characteristics for all traffic conditions.

Optionally, a particulate may be used to impart abrasiveness to the paint composition and is either a natural abrasive material, such as fine sand, silica, ground marble (white marble preferred), corundum (aluminum oxide, emery), pumice, iron oxide and feldspar, or a synthetic abrasive material. The more important synthetic types include, but are not limited to, silicon carbide, boron carbide, cerium oxide and fused alumina. Some reflective substances (for example crushed reflective glass) may even be used, as long as they will impart an effective abrasiveness to the surface of the dried paint. This abrasiveness reduces the likelihood of skidding by motor vehicles both in clear weather as well as when the surface of the road is wet. The operable range is an additive amount from about 1% to about 15% parts by volume, with a preferred range of about 1% to about 13%, with about 1% to about 9% being most preferred.

Another embodiment provides a luminescent paint that contains a binder to adhere the particles of the compositions in the final product. The binder is selected to provide good adherence of the phosphor particles to each other and to the underlying substrate, with appropriate physical properties.

The binder includes, but is not limited to, a cross-linked and polymerized dimethyl silicone copolymer, which is flexible and resistant to degradation in ultraviolet (UV) light. Such binders are disclosed in greater detail in U.S. Pat. No. 5,589,274, whose disclosure is incorporated by reference. The silicone polymer exhibits a good degree of deformability without cracking, both when pigment is present at moderate levels and when it is not present. This deformability permits the final solid paint to deform during the bending of the substrate when a thin substrate is used or permits the film to deform. The deformability of the binder also improves the resistance of the paint or film to cracking as a result of impacts and the like during service. Other flexible polymeric materials may be used for the matrix, such as silicone-modified epoxy, polyurethane, poly(dimethylsiloxane), poly(dimethylsiloxane-co-methylphenylsiloxane), and polyamide.

The binder is present in an operable amount. In a typical case, the binder is present in an amount such that the ratio, by weight, of the composition to the binder is from about 3:1 to about 5:1. If the ratio is less than about 3:1, the resulting paint tends to be transparent after drying. If the ratio is more than about 5:1, the critical phosphor volume concentration (CPVC) may be exceeded, the paint may have insufficient mechanical strength, and the paint may fall apart when dried.

The mixture of phosphor and binder is ordinarily a solid, and a paint vehicle may be added to form a solution or a slurry that may be applied using conventional painting techniques. An exemplary paint vehicle is naphthalene or xylene. The amount of the paint vehicle is selected to provide a consistency that permits application of the paint by the desired approach. For example, application by spraying requires the use of more of the paint vehicle than application by brush or roller.

The composition particles, binder, and paint vehicle are mixed together and milled together to form a liquid paint formulation in which the particles do not rapidly separate. There may be some separation over extended periods of time, but the paint is normally stirred or agitated just before or at the time of application.

Resins/Polymers

The disclosed compositions may be combined or dispersed in organic, inorganic, natural or synthetic resins. In addition, the polymers can include, but are not limited to, thermosetting polymers and thermoplastic polymers.

Suitable organic resins include but are not limited to polyoxyalkylene polymers such as polyoxyethylene, polyoxypropylene, polyoxybutylene, polyoxytetramethylene, polyoxyethylene/polyoxypropylene copolymer, and polyoxypropylene/polyoxybutylene copolymer; hydrocarbon polymers such as ethylene/propylene copolymer, polyisobutylene, isobutylene/isoprene copolymer, polychloroprene, polyisoprene, isoprene or butadiene/acrylonitrile and/or styrene copolymer, polybutadiene, isoprene or butadiene/acrylonitrile, and/or styrene copolymer, and hydrogenated polyolefin polymers obtained by hydrogenating these polyolefin polymers; polyester polymers obtained by the condensation of dibasic acids such as adipic acid with glycols or by the ring-opening polymerization of lactones; acrylate ester polymers such as polyacrylate esters obtained by the radical polymerization of monomers such as ethyl acrylate and butyl acrylate and acrylate ester copolymers of acrylate esters such as ethyl acrylate and butyl acrylate with vinyl acetate, acrylonitrile, methyl methacrylate or styrene; graft polymers obtained by the polymerization of a vinyl monomer in the above organic polymers; polysulfide polymers; polyamide polymers such as nylon 6 obtained by the ring-opening polymerization of ε-caprolactam, nylon-6,6 obtained by the polycondensation of hexamethylenediamine with adipic acid, nylon-6,10 obtained by the polycondensation of hexamethylenediamine with sebacic acid, nylon-11 obtained by the polycondensation of ε-aminoundecanoic acid, nylon-12 obtained by the ring-opening polymerization of ε-aminolaurolactam, and nylon copolymers having two or more components selected from the above nylons; polycarbonate polymers obtained by, for example, the polycondensation of bisphenol A with carbonyl chloride; diallylphthalate polymers; and the like. Polymers having the above main chain structures include but not are limited to, polyester polymers, acrylate ester polymers, acrylate ester copolymers, polyoxyalkylene polymers, hydrocarbon polymers, polycarbonate polymers, and the like.

Additional resins useful in the disclosed compositions include epoxy resins. Suitable epoxy resins may be saturated, unsaturated or mixed; linear, branched or mixed; aliphatic, aliphatic with aromatic moieties, heterocyclic or mixed. Such resins may also bear other substituents that do not materially interfere with the desired curing reaction. Examples of such substituents include, but are not limited to, halogens such as bromine and chlorine and substituted aliphatic or aromatic groups. Aliphatic epoxy resins are preferred for applications in highly ultraviolet (UV)-resistant topcoats, while polyglycidyl ethers of di- or polyhydric phenol type aromatic epoxy resins (infra) can be used preferably for other types of applications.

Additionally, the epoxy resin may be monomeric or polymeric (including polymers and oligomers in all forms from dimers and up). Depending primarily on their chemical compositions and molecular weights, the epoxy resins can be liquid, solid or mixtures under ambient conditions, particularly at room temperature (about 25° C.). Liquid epoxy resins under ambient conditions are more preferred for the curable epoxy composition of the present disclosure. If solid epoxy resins are used, it is preferred to dissolve them in a suitable solvent to make epoxy resin-containing solutions for ambient condition applications. Epoxy resin suspensions or emulsions also may be used.

One group of suitable epoxy resins, including the glycidyl or polyglycidyl ethers, may be prepared by reacting epichlorohydrin with a compound containing at least one, preferably at least two or more, hydroxyl groups under basic conditions, such as in an alkaline reaction medium or in the presence of a suitable base. Examples of such suitable epoxy resins include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between these epoxy resins and additional polyhydric phenolic compounds such as those disclosed and described in U.S. Pat. Nos. 3,477,990 and 4,734,468, both of which are incorporated herein in their entirety, and mixtures thereof. Examples of suitable phenolic compounds used in preparing these epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl)cyclohexane, 2,6,2',6'-tetrachloro-p, p'-bisphenol A, 2,6,2',6'-tetrabromo-p,p'-bisphenol A, 2,6,2',6'-tetramethyl-3,5,3'-tribromo-p-p'-biphenol, 2,6,2',6'-tetramethyl-3,5,3',5+-tetrabromo-p,p'-biphenol, tetramethylbiphenol, 1,5-dihydroxynaphthalene, bis(2-hydroxy-1-naphthyl)methane, bis(4-hydroxyphenyl) sulfone, bis(4-hydroxyphenyl)ether, and the like, and mixtures thereof. Some examples of commercially available epoxy resins of this group include, but are not limited to, EPON®Resins 825, 826, 828, 862 and 1000 from Shell Chemical Company. (EPON® is a registered trademark of Shell Oil Company.)

Another group of epoxy resins within the scope of the present disclosure is useful for elastomeric or semi-elastomeric secondary containment membrane applications due to the desired low viscosity, low modulus and high elongation properties of the cured product. This group includes, but is not limited to, polyglycidyl ethers of aliphatic or cycloaliphatic glycols, triols, polyols, or polyglycols. Examples of these glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane, and mixtures thereof. Similar to the di- and polyhydric phenol based epoxy resins, these aliphatic glycidyl and polyglycidyl ethers are usually prepared by reacting epichlorohydrin with a selected aliphatic diol (or triol polyol, polyglycol, or mixtures thereof) in the presence of a Lewis acid catalyst, followed by conversion of the reaction intermediate(s) with sodium hydroxide to produce the product(s). Examples of commercially available epoxy resins in this group include, but are not limited to, HELOXY® Modifier 32 (a diglycidyl ether of a polypropylene oxide) glycol), HELOXY® Modifier 68 (the diglycidyl ether of neopentyl glycol) and HELOXY® Modifier 107 (the diglycidyl ether of 1,4-cyclohexanedimethanol) from Shell Chemical Company. (HELOXY® is a registered trademark of Shell Oil Company.)

Suitable natural polymers include, but are not limited to, cellulose, starch, polysaccharides, wool, and silk.

Those of ordinary skill in the art will appreciate that the compositions of this disclosure can be prepared using starting materials other than those specifically disclosed herein and that procedures and techniques functionally equivalent to those described herein can be employed to make and assess the phosphors herein. Those of ordinary skill in the art will also appreciate that the host matrix of this disclosure may accommodate metal ions other than those specifically mentioned herein without significant effect upon composition properties.

EXAMPLE 1

Qualify specific color formulations for pigments (VuLAR) containing Phosphorescence Material developed by University of Georgia Research Foundation (UGARF) according to the teachings of U.S. Pat. No. 4,725,316, which is incorporated by reference in its entirety.

Reagents

Bluish-green aluminate phosphorescent pigments (UGAB) were produced as described in U.S. Pat. No. 6,117,362 (which is incorporated by reference in its entirety). U.S. Pat. No. 6,117,362 discloses-long-persistent alkaline earth aluminate blue phosphors of the general form $MO.mAl_2O$ activated by $Eu^{2+}$ in combination with at least one trivalent metal ion such as $Dy^{3+}$. M is an alkaline earth element such as Ca, Mg, Ba, or Sr. In this formula, m is a number ranging from about 1.6 to about 2.2.

Yellowish-green aluminate phosphorescent pigments (UGAG) were produced as described in U.S. Pat. No. 6,267,911, which is incorporated by reference in its entirety. U.S. Pat. No. 6,267,911 discloses long-persistent alkaline earth aluminate green phosphors of the general form $M_kAl_2O_4$ activated by $Eu^{2+}$ in combination with at least one trivalent metal ion such as $Dy^{3+}$. M is an alkaline earth element such as Ca, Mg, Ba, or Sr. In these phosphors, k=1−2x−2y, where x ranges from about 0.0001 to about 0.05 and y ranges from about x to about 3x.

Yellow (UGA Yellow) to red (UGA red) phosphorescent pigments were produced as described in U.S. patent application Ser. No. 10/374,696, which is incorporated by reference in its entirety.

Additional yellow phosphorescent pigment (GSR) were obtained from United Mineral and Chemical (UMC) of Lyndhurst, N.J.

Various fluorescent pigments (FB Series) were obtained from UMC.

White Zinc-Sulfide (ZnS) Pigment and Optical Brightener (OB) were obtained from commercial sources.

Procedure

At room temperature, seven individual VuLAR formulations (2480 Blue, 2409 Greenish-blue, 2496 Bluish-green, 2543 Green, 2572 Yellow, 2595 Orange and 3008 White) were qualified by combining differing amounts by weight of the reagents listed above and gently milling:

2480>100 parts UGAB and 5 parts FB 905
2490>100 parts UGAB and 1.2 parts FB905 and 2.7 parts FB805
2496>100 parts UGAB and 1.5 parts FB 905 and 2.4 parts FB805
2543>100 parts UGAG and 4 parts FB 805
2575>50 parts UGA Yellow and 50 parts UGAG and 3 parts FB205
2595>80 parts UGA Yellow and 20 parts UGAG and 3 parts FB305

FB are different types of fluorescent pigments sold by United mineral and Chemical Corporation, where different numbers correspond to different colors.

Results

All VuLAR formulated pigments were found to have excellent persistence with no malodorous odor.

These pigments can now be used for integration into varied and numerous plastics, paint and water-based matrices. All of these matrices should be comprised of transparent thin walled material.

EXAMPLE 2

Integrate qualified VuLAR pigments of Example 1 into Plastisol Screen printing Inks for the purpose of printing on fabric.

Reagents

VuLAR Pigments: 2480, 2490, 2596, 2543, 2575, 2595, and 3008 Screenprinting Plastisol Ink (Viacron 90/10 Neutral) from Loes Enterprises of St. Paul, Minn.

Procedure

At room temperature powdered VuLAR Pigments containing UGA phosphors were incorporated into Viacron ink in its clear, primary form using a high-speed dispersion blade mixer at 1000 rpm for 5 minutes. Pigments were added in proportions of 25 to 35% by weight.

These pigmented inks were then applied to a white pelon substrate employing a silkscreen and a neoprene doctors' blade. The printed treatment was then baked in an oven at 230 degrees Fahrenheit for 3 minutes. Tools were cleaned using acetone solvents.

Results

All cured VuLAR formulated inks were found to have excellent persistence with no malodorous odor. Loading of 33% was found to be preferable.

EXAMPLE 3

Novel Acrylic Paint Incorporating Pigments from Example 1 Integrate qualified VuLAR pigments into solvent-based acrylic lacquer paint Reagents:

VuLAR Pigments: 2480, 2490, 2496, 2543, 2575, 2595, and 3008 acrylic lacquer paint (V-100) from Sticker Paints of Novi, Mich.

Procedure

At room temperature powdered VuLAR Pigments containing UGA phosphors were incorporated into V-100 in its primary form using a high-speed dispersion blade mixer at 1500 rpm for 5 minutes. Pigments were added in proportions of 25 to 35% by volume.

These pigmented paints were then applied to a white-canvas-board substrate employing a #6 artist china bristle brush. The painted treatment was then allowed to dry at room temperature in open air for 25 minutes. Tools were cleaned using lacquer thinner solvents.

Results

All cured VuLAR formulated paints were found to have excellent persistence.

Loading of 30% by volume was found to be preferable.

EXAMPLE 4

Latex Paint Incorporating Pigments from Example 1 Integrate qualified VuLAR pigments into water-based Latex Paint Reagents VuLAR Pigments 2490, 2543, and 3008 Latex Paint Base (V-200) from Stricker Paints of Novi, Mich.

Acrylic Gresso, Matte Medium, High Gloss Medium and Varnish, Gloss Medium and Varnish; all from Liquitex Artist Materials of Piscataway, N.J.

Procedure

At room temperature powdered VuLAR Pigments containing UGA phosphors were incorporated into V-200 in its clear primary from using a high speed dispersion blade mixer at 500 rpm for 5 minutes at 25 to 35% by volume. To this compound various mediums and various latex paint additives from Liquitex were added employing a tongue depressor for gentle stirring.

The pigmented paints were then applied to a white canvas board substrate employing a #6 china bristle brush. The painted treatment was allowed to dry in open air for ten minutes. Tools were cleaned using soap and water.

Results

All cured VuLAR pigmented paints were found to have excellent persistence with no malodorous odor.

Mixing at speeds greater than 500 rpm was found to introduce unwanted air bubbles into paint blend.

The latex paint from Stricker used by itself was found to generate a very grainy cured surface. Of all the mediums tried, only the Gloss Medium and Varnish was found to adequately improve the surface quality of the cured paint.

Loading of 30% by volume was found to be preferable.

EXAMPLE 5

Crayons Incorporating Pigments from Example 1
Integrate qualified VuLAR pigments into waxed-based crayons Reagents VuLAR Pigments 2490, 2543, and 3008

High molecular weight polyethylene glycol (Baker 20M) from Mallinckrodt Baker of Phillipsburg, N.J.

Surfactant (Kessco 6M) from Stepan Company of Northfield, Ill.

Stearyl Alcohol (TZ1618) from Milford, Conn.

Low molecular weight polyethylene glycol (Carbowax 540) from Union Carbide of Danbury, Conn.

Oleyl Alcohol (Tego 85) from Goldsmidt Chemical of Hopewall, Va.

Talk (Nytal 400) from RT Vanderbilt Company of Norwalk, Conn.

Procedure 6 wt. % of Baker 20M, 24 wt. % of Kessco 6M, 6 wt. % of Carbowax 540, 31 wt. % of TA1618, and 6 wt. % of Tego 85 were combined in a metal crucible. The mixture was heated in an oven at a temperature of 240 degrees Fahrenheit for 20 minutes. To this molten state of the mixture, 3 wt. % of Nytal 400 and 24 wt. % of VuLAR Pigments containing UGA Phosphors were added employing a wooden crafts stick.

Marks were made on white canvas board substrate.

Results

All cured VuLAR pigmented crayons were found to have excellent persistence with no malodorous odor. Marking ability of the VuLAR pigmented crayons was found to be satisfactory for demonstrational purposes. Lay-down could be increased by minor adjustments to proportional relationships of all ingredients, especially Carbowax.

Marks made by the crayons were found to have excellent persistence with no malodorous odor.

EXAMPLE 6

Manufacturing of Blends with Polyethylene (Pigments from Example 1)
Integrate qualified VuLAR pigments into a polyofefin compound.

Reagents

VuLAR Pigments: 2480, 2490, 2496, 2543, 2575, 2595, and 3008

Polyethylene Adhesive (Epolene C13) from Eastman Chemical of Kingston, Tenn.

Procedure

Powdered VuLAR Pigments containing UGA phosphors were combined with pelletized Epolene C13 at 30% by volume in a metal crucible. The mixture was heated in an oven at 230 degrees Fahrenheit for 20 minutes. The mixture was removed and stirred gently with a polystyrene rod and placed back in the oven for another 5 minutes. While the mixture remained molten, one end of the polystyrene rod was twirled in the mixture thereby gathering some of the mixture. This compilation was immediately submerged into cold water thereby solidifying the Epolene.

Results

All VuLAR formulated Epolene C13, both molten and solid, was found to have excellent persistence, no malodorous odor, and extraordinary clarity for the exhibition of the effect of matching fluorescence and emitted color in a single matrix.

EXAMPLE 7

PVC Blend that Incorporates Pigments from Example 1

These blends are especially intended for the manufacture of electronic wiring coatings. Other articles include gas pipes, fuel pipes, and the like. This example demonstrates the ability to coat wire with Polyvinyl Chloride including VuLAR formulated pigments containing UGA Phosphors.

Reagents

VuLAR Pigments: 2480, 2490, 2496, 2543, 2575, 2595, and 3008

Polyvinyl Chloride Plastisol (Hot Dip 100) from Loes Enterprises of St. Paul, Minn.

Procedure

VuLAR formulated pigments containing UGA phosphors were incorporated into Hot Dip 100 employing a wooden crafts stick. The mixture was poured into a hand-made aluminum foil trough. A piece of aluminum 6 gauge wire was preheated in an oven at 350 degrees Fahrenheit for 3 minutes. The preheated wire was horizontally rotated in the trough thereby gathering some of the mixture as a film encasing the wire. The film-encased wire was placed back in the oven for another 3 minutes thereby curing the Hot Dip 100 and effectively coating the wire.

Results

All coatings containing VuLAR formulated pigments were found to have excellent persistence with no malodorous odor. These coatings adequately demonstrate an ability to color code sire with phosphorescent materials.

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein, within the scope of this disclosure and protected by the following claims.

What is claimed is:

1. A composition comprising:
   a phosphor that emits radiation in a first range of wavelengths; and
   a fluorescent pigment that fluoresces radiation in a second range of wavelengths, wherein the first range of wavelengths and the second range of wavelengths are substantially the same,
   wherein the first range of wavelengths and the second range of wavelengths are in the infrared wavelength spectrum, or wherein the first range of wavelengths and the second range of wavelengths are in the ultraviolet wavelength spectrum.

2. The composition of claim 1, wherein the phosphor is a long-persistent phosphor.

3. The composition of claim 1, wherein the first range of wavelengths and the second range of wavelengths are in the infrared wavelength spectrum.

4. The composition of claim 1, wherein the first range of wavelengths and the second range of wavelengths are in the ultraviolet wavelength spectrum.

5. The composition of claim 1, wherein the phosphor and the fluorescent pigment are incorporated into a matrix, a resin, an ink, a fluid, a wax, a paint, a vehicle, a carrier, or a combination thereof.

6. A crayon comprising the composition of claim 1.

7. A paint comprising the composition of claim 1.

8. An ink comprising the composition of claim 1.

9. A polymer composition, comprising a polymer and the composition of claim 1.

10. The polymer composition of claim 9, wherein the polymer is a thermosetting polymer.

11. The polymer composition of claim 9, wherein the polymer is a thermoplastic polymer.

12. A method for producing a composition comprising:
    combining at least one phosphor and at least one fluorescent pigment to form a composition as described in claim 1, wherein the composition fluoresces light and emits light at approximately the same wavelength or combination of wavelengths.

13. The method of claim 12, wherein the phosphor is a long-persistent phosphor.

* * * * *